Patented Oct. 12, 1948

2,451,314

UNITED STATES PATENT OFFICE 2,451,314

PRODUCTION OF ALKYL CYANIDES

Leland K. Beach, Mountainside, N. J., assignor to Standard Oil Development Company, a corporation of Delaware No Drawing. Application February 12, 1947, Serial No. 728,199

7 Claims. (Cl. 260—465.1)

Alkyl cyanides or nitriles are receiving extended use as the added material put in hydrocarbon mixtures to form an azeotropic combination with one or more of the hydrocarbons in the mixture thus making possible azeotropic distillation and the separation of hydrocarbons that cannot be separated successfully by straight distillation. The alkyl cyanides are not found in nature, but have been prepared synthetically by several processes which include reacting alkyl halide with alkali metal cyanides; from carboxylic acids through the intermediary of the corresponding amide; from primary amines by treatment with bromine and potassium hydroxide; from aldoximes by dehydration; from Grignard reagents and from carboxylic acid esters and ammonia. It is to be noted that in the foregoing enumerated processes either a complicated chemical process is involved or one or more of the reactants is either not plentiful and cheap or can be obtained only after extended and complicated chemical manipulation. It is an object of the present invention to produce alkyl cyanide from materials which are relatively plentiful and therefore cheap by a very simple process.

It has now been found that the alpha (alkylol) nitriles having the general formula

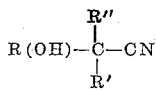

where R is an alkylene or alkylidene radical, such as methylene, ethylene, propylene, propylidene, etc., and R' and R'' are either hydrogen or alkyl radicals, such as methyl, ethyl, propyl, etc. and wherein the hydroxy group is attached to a carbon atom other than the carbon atom to which the nitrile group is attached, can be decomposed to an alkyl cyanide and aldehyde or ketone by passing the alpha (alkylol) nitrile either in liquid or vapor phase through an empty tube at 300–600° C. or through a tube containing an inert material heated to from 300–600° C. Specific examples of the alpha (alkylol) nitrile contemplated within the scope of the present invention are ethylene cyanohydrin, gamma-hydroxypropionitrile, beta-hydroxycyclohexylcyanide, etc. The alpha hydroxy alkyl cyanides of which acetone cyanohydrin is a specific example are excluded from the scope of this invention. The inert material over which the alpha (alkylol) nitrile is passed is illustrated by the substances pumice, kieselguhr, alundum, corundum and diatomaceous earth.

According to the present invention, an alpha (alkylol) nitrile, such as ethylene cyanohydrin, is vaporized and passed through an empty tube or in contact with an inert material, which is either in granular or powdered form, heated to a temperature of 300–600° C., preferably about 500° C., at such a rate that the vapors are in contact with the inert material for a period of from 1–20 seconds, preferably about 6 seconds. In this manner, the alpha (alkylol) nitrile is decomposed to alkyl cyanide and a carbonyl compound such as an aldehyde or ketone. The vapors from the reaction are passed into a water-cooled condenser, or any other convenient means for condensing the vapors may be employed. The vapors condense giving a liquid alkyl cyanide and a crystalline product of aldehyde.

The following examples will serve to illustrate the principles of the invention in greater detail:

Example 1

Ethylene cyanohydrin boiling at 105–110° C. (10 mm. mercury) prepared by the addition of HCN to ethylene oxide in the presence of calcium oxide was dropped from a graduated reservoir onto the inside surface of a ½ in. inner diameter empty Pyrex reactor. The reactor was surrounded by a ¾ in. iron pipe which in turn was welded in an electrically heated lead bath. The reaction zone was 30 cm. long. Its peak temperature was 508° C. and its extremities 478° C. Average contact time was 8 seconds and average linear velocity was 3.8 cm. per second, although some variations occurred during the experiment. Product recovery was 99.6 wt. per cent. Treatment of a portion of the product with alkaline hydrogen peroxide to convert formaldehyde to formic acid indicated a 13 mol per cent formaldehyde yield corrected for nitrile hydrolysis. Distillation of the main body of product left about 87 wt. per cent residue assumed to be unconverted ethylene cyanohydrin although some polyoxymethylene was evident. The product distillate was divided into two cuts of crude acetonitrile equivalent to a 13 mol per cent yield and a third cut containing mostly polyoxymethylene amounting to a 2.6 mol per cent yield. Redistillation of the crude acetonitrile cut from excess water gave less than 15% boiling at 71° C. which is not as low as the acrylonitrile-water azeotrope boiling point of 70.1° C. However, the presence of a two-phase condensation confirmed the presence of some acrylonitrile. The remaining 85% boiled mainly at 74–76° C. which closely approximates the boiling point of the acetonitrile-water azeotrope.

Example 2

A second run feeding ethylene cyanohydrin to a 1.3 cm. inner diameter Pyrex reactor of 30 cm. length at a reaction temperature of 520° C., contact time of 16.8 seconds, and reaction time of 1.2 hours, produced a yield of 27 mol per cent of acetonitrile and formaldehyde.

The reaction whereby ethylene cyanohydrin is decomposed to yield acetonitrile and formaldehyde is seen, from the above examples, to be thermal. It has also been found that the reaction proceeds somewhat better in tubes packed with inert material, such as pumice, kieselguhr, etc., probably due to improved heat transfer or increased heated surface. The results obtained by the use of inert material are exemplified by the following examples:

Example 3

142 grams of ethylene cyanohydrin were vaporized and passed in contact with granular pumice heated to a temperature of 410° C. at a contact time of 6.5 seconds. The vapors from the reaction were condensed in a packed water condenser and the condensate run into a flask submerged in an ice bath. 111.5 grams of condensate were recovered containing 65.9 grams ethylene cyanohydrin, 39.6 grams acetonitrile and 6 grams of polymeric formaldehyde.

Yield=31 mol per cent ethylene cyanohydrin converted to acetonitrile
Conversion=54 mol per cent of ethylene cyanohydrin disappeared.
Selectivity=57%

Example 4

103.6 grams of ethylene cyanohydrin were contacted with pumice for 2.8 seconds at 487° C. The products were condensed and isolated as in Example 1. 29% of the ethylene cyanohydrin was recovered unchanged and 49 mol per cent was recovered as acetonitrile.

Yield=49%
Conversion=71%
Selectivity=69%

This application is a continuation-in-part of my application, U. S. Serial No. 516,841, filed January 3, 1944, now abandoned.

What is claimed is:

1. The method of converting a beta hydroxy aliphatic nitrile into a lower molecular weight aliphatic nitrile and an aliphatic carbonyl compound which comprises subjecting the beta hydroxy aliphatic nitrile to thermal decomposition in a reaction zone at a temperature of 300–600° C, at a contact time of 1 to 20 seconds and in the absence of an active solid material.

2. A method for producing acetonitrile which consists in heating ethylene cyanohydrin at 300–600° C. at a contact time of from 1–20 seconds and in the absence of an active solid material.

3. A method for producing acetonitrile which consists in heating ethylene cyanohydrin with an inert solid material at 300–600° C. for a contact time of from 1 to 10 seconds.

4. A method for producing acetonitrile which consists in heating ethylene cyanohydrin with pumice at 300–600° C. for a contact time of from 1 to 10 seconds.

5. A method for producing acetonitrile which consists in heating ethylene cyanohydrin with pumice at about 500° C. for a contact time of about 3 seconds.

6. A method for producing acetonitrile which consists in heating ethylene cyanohydrin at about 400° C. with pumice for a contact time of about 6 seconds.

7. The method of converting a beta hydroxy aliphatic nitrile into a lower molecular weight aliphatic nitrile and an aliphatic carbonyl compound which comprises subjectng the beta hydroxy aliphatic nitrile to thermal decomposition in a reaction zone containing inert solid material at a temperature of 300–600° C. and at a contact time of 1–20 seconds.

LELAND K. BEACH.

REFERENCES CITED

The following references are of record in the file of this patent:

UNITED STATES PATENTS

| Number | Name | Date |
|---|---|---|
| 1,891,055 | Reppe et al. | Dec. 13, 1932 |
| 2,374,051 | Spence | Apr. 17, 1945 |
| 2,386,586 | Brant et al. | Oct. 9, 1945 |
| 2,413,773 | Miller | Jan. 7, 1947 |

FOREIGN PATENTS

| Number | Country | Date |
|---|---|---|
| 496,372 | Germany | Apr. 24, 1930 |

OTHER REFERENCES

Lipp, Liebig's Ann. der Chemie, vol. 205, page 24 (1880).